(12) United States Patent
Braman et al.

(10) Patent No.: US 7,645,435 B2
(45) Date of Patent: Jan. 12, 2010

(54) SODIUM CARBONATE RECOVERY FROM WASTE STREAMS AND IMPOUNDED SODIUM CARBONATE DECAHYDRATE DEPOSITS

(75) Inventors: Victor E. Braman, Green River, WY (US); Marco A. Cortes, Green River, WY (US); Falcon A. Price, Green River, WY (US); Stephen T. Gaddis, Green River, WY (US); Todd M. Lessard, Green River, WY (US); James M. Shepard, Wilmington, DE (US); Derral W. Smith, Green River, WY (US)

(73) Assignee: General Chemical Industrial Products, Inc., East Hanover, NJ (US)

( * ) Notice: Subject to any disclaimer, the term of this patent is extended or adjusted under 35 U.S.C. 154(b) by 137 days.

(21) Appl. No.: 10/831,859

(22) Filed: Apr. 26, 2004

(65) Prior Publication Data

US 2004/0197258 A1 Oct. 7, 2004

Related U.S. Application Data

(63) Continuation of application No. 10/061,477, filed on Jan. 31, 2002, now abandoned.

(51) Int. Cl.
*C01D 7/12* (2006.01)
(52) U.S. Cl. ..................... 423/427; 423/206.2
(58) Field of Classification Search ............. 423/206.2, 423/421, 426, 427
See application file for complete search history.

(56) References Cited

U.S. PATENT DOCUMENTS

| | | | |
|---|---|---|---|
| 3,264,057 A | | 8/1966 | Miller et al. |
| 4,039,618 A | * | 8/1977 | Gancy et al. ............ 423/206.2 |
| 4,584,077 A | | 4/1986 | Chlanda et al. |
| 4,869,882 A | | 9/1989 | Dome et al. |
| 5,192,164 A | | 3/1993 | Frint et al. |
| 5,238,664 A | | 8/1993 | Frint et al. |
| 5,262,134 A | * | 11/1993 | Frint et al. .................. 423/184 |
| 5,283,054 A | | 2/1994 | Copenhafer et al. |
| 5,618,504 A | | 4/1997 | Delling et al. |
| 5,624,647 A | | 4/1997 | Zolotoochin et al. |
| 5,759,507 A | * | 6/1998 | Delling et al. .............. 423/426 |
| 5,766,270 A | * | 6/1998 | Neuman et al. ............ 23/302 T |
| 5,955,043 A | | 9/1999 | Neuman et al. |
| 6,022,385 A | * | 2/2000 | Bowman ................... 23/302 T |
| 6,228,335 B1 | | 5/2001 | Copenhafer et al. |
| 6,251,346 B1 | | 6/2001 | Neuman et al. |
| 6,322,767 B1 | * | 11/2001 | Neuman et al. ............ 423/421 |
| 6,428,759 B1 | * | 8/2002 | Smith et al. ............... 423/206.2 |
| 6,576,206 B2 | * | 6/2003 | Copenhafer et al. ...... 423/206.1 |
| 6,589,497 B2 | * | 7/2003 | Smith ........................ 423/421 |
| 2003/0017099 A1 | * | 1/2003 | Kurtz ........................ 423/422 |
| 2003/0049192 A1 | * | 3/2003 | Braman et al. ............. 423/266 |

* cited by examiner

*Primary Examiner*—Stuart Hendrickson
(74) *Attorney, Agent, or Firm*—Artuur J. Plantamura

(57) ABSTRACT

A process is described for recovering sodium carbonate or other sodium-based chemicals from sodium-bearing streams, including in particular mine water, evaporative pond water and sodium carbonate decahydrate deposits, recycle and purge streams, and other waste streams. In the process sodium bicarbonate-bearing streams are decarbonized to reduce the sodium bicarbonate concentration in a combination with other sodium-bearing streams, resulting in a liquor suitable as feed to a sodium carbonate decahydrate or sodium carbonate monohydrate process. The sodium bicarbonate stream is combined in a mix tank with other sodium carbonate bearing streams where the concentration is adjusted to form a liquor suitable to feed a sodium decahydrate or sodium carbonate monohydrate evaporation/crystallization step. In the process the combination of the various sodium-bearing streams is decarbonized to below 3.5% sodium bicarbonate when fed to a sodium decahydrate process and to below 1% sodium bicarbonate when fed to a sodium carbonate monohydrate process. The feed streams are adjusted in sodium carbonate concentration by higher concentrated sodium carbonate-bearing streams or by addition of sodium carbonate decahydrate produced from said streams or recovered form evaporation pond deposits, are then processed to produce sodium carbonate decahydrate or sodium carbonate monohydrate or further processed to form other sodium carbonate salts.

9 Claims, 1 Drawing Sheet

SODIUM CARBONATE RECOVERY FROM WASTE STREAMS AND IMPOUNDED SODIUM CARBONATE DECAHYDRATE DEPOSITS

This application is a continuation of application Ser. No. 10/061,477, filed Jan. 31, 2002, now abandoned.

This invention relates to a process for recovering sodium carbonate or other sodium based chemicals from sodium carbonate-bearing streams, especially mine water, evaporative pond water, recycle and purge streams, and other waste streams obtained in the course of processing trona.

BACKGROUND OF THE INVENTION

Processes favored in the United States for the production of soda ash are the sodium carbonate sesquicarbonate process and the sodium carbonate monohydrate process. Both processes purify crude trona to produce refined soda ash. Almost all of the soda ash produced in the United States is obtained from a vast deposit of crude, mineral trona ($Na_2CO_3 \cdot NaHCO_3 \cdot 2H_2O$) located in Green River, Wyo. The trona deposit is made up of several trona beds about 800 to 3000 feet underground. These trona beds are separated by layers of shale that generally overlap each other. The quality of the trona varies depending upon its location in the deposit. Crude trona consists primarily of about 87-88% of sodium sesquicarbonate ($Na_2CO_3 \cdot NaHCO_3 \cdot 2H_2O$) and about 11-13% insoluble clays and shales, and in lesser amounts, sodium chloride (NaCl), sodium sulfate ($Na_2SO_4$), and organic matter. The amount of impurites present is sufficiently large so that this crude trona must be purified to remove or reduce the impurities before the soda ash or other sodium carbonate salts derived from the trona can be produced and sold for commercial use.

Sesquicarbonate

The Sesquicarbonate processing steps involve: dissolving the crude mined trona in a cycling, hot mother liquor containing excess normal carbonate over bicarbonate in order to dissolve the trona congruently, clarifying the insoluble muds from the solution, filtering the solution, passing the filtrate to a series of vacuum crystallizers where water is evaporated and sodium sesquicarbonate crystals form and are separated from the mother liquor, recycling the mother liquor to dissolve more crude trona; and calcining the sesquicarbonate crystals to soda ash.

Monohydrate

The Monohydrate processing steps involve: calcining the crude mined trona converting it to crude soda ash, dissolving the crude soda ash in water, clarifying the resulting sodium carbonate liquor to remove insoluble muds from the solution, filtering the solution, passing the filtrate to an evaporator circuit (multiple effect evaporator or mechanical vapor recompression evaporator) where water is evaporated and sodium monohydrate crystals are formed and separated from the mother liquor, recycling the mother liquor to the evaporator circuit, and calcining the monohydrate crystals to soda ash.

The processes for the production of soda ash and other sodium carbonate salts employ crystallization steps that concentrate impurities in the mother liquors. Purge streams are required in these processes (Solvay, Sesquicarbonate, Monohydrate, Decahydrate, Sodium Bicarbonate, and processes that recover sodium values from solution mining liquors) to control impurity levels to meet quality requirements. Processes have been described in the prior art for recovering the alkali values from these various waste streams. Processes that employ the sodium decahydrate process must eliminate or significantly reduce the sodium bicarbonate concentration through decarbonizing using steam stripping, sequential crystallization, or addition of expensive neutralizing agents such as caustic soda or lime. Processes that produce more than one product are limited by the demand for the less widely used product: sodium sesquicarbonate, light or medium density soda ash, or sodium bicarbonate; otherwise, the product in less demand might be further processed to dense soda ash. These prior art methods are typically complex procedures, involving multiple steps in which various forms of sodium carbonate are crystallized, and these multiple crystallization operations add significantly to the overall economic cost of the soda ash recovery processes.

Typically, in the manufacture of soda ash, a system of storage ponds has been used to accommodate disposal of the insoluble grits and muds, purge streams, mine water, and other sources of waste waters inherent to the process. These ponds are also used to maintain water balance through the process of natural evaporation and can provide a source of cooling water for the evaporator trains. Over the years, a significant amount of the total mined sodium carbonate has been lost from processing as a constituent in the water discharge. As this sodium carbonate-bearing water is discharged to the ponds, the water evaporates, leading to continual concentration of the soda ash in the ponds. This soda ash resides in the system through the deposition of sodium carbonate decahydrate crystals on the pond bottoms, reducing the total pond volume. A substantial amount of sodium carbonate decahydrate, which in its crystalline form naturally excludes impurities, resides in these ponds. This reduction in volume results in two major problems for a facility of substantial commercial size; first, the need to expand existing or constructing additional waste cells to impound insolubles; and second, inadequate evaporation and hence inadequate cooling of the water used for cooling purposes.

Although the insolubles amount to only a small faction of the ore, over time these accumulate to sizeable volumes, for example, amounting to over 288,000 tons per year when operating a plant producing 2,400,000 tons per year of soda ash. Several methods for disposing of these grits, muds, and waste streams have been described in the prior art and involve a process of returning these insolubles to the mine taking advantage of the space created in mined-out areas. However, many problems exist because of the presence of water associated with the solid impurities. The water will drain from the solids over time, creating a messy and hazardous condition that must be confined and the water collected. For example, the water has been known to dissolve the ribs and floor in areas where subsidence has not occurred, compromising the mining panel. Recovery of water in subsided panels presents other problems. To improve recovery efficiency, the addition of alkaline hydroxides or alkaline earth metals, to concentrations up to 10% of the aqueous slurry solution are described has been employed.

A complicating factor in dissolving trona deposits is that sodium carbonate and sodium bicarbonate that comprise the trona have different solubilities and dissolving rates in water. These incongruent solubilities of sodium carbonate and sodium bicarbonate tend to cause bicarbonate "blinding" when employing solution mining techniques. "Blinding" is an occurrence which has long been recognized as a problem by the art in the solution mining industry.

Solution mining techniques suffer from several disadvantages. It is apparent that a significant continuing problem associated with solution mining is the subsequent recovery of sodium carbonate from relatively low concentration of carbonate and bicarbonate in the solution brine. Unless the bicarbonate concentration is reduced, solution mining brines will contain an unacceptable high level of sodium bicarbonate and other impurities to prevent processing into sodium carbonate by the conventional monohydrate process. A major problem experienced is due to the co-precipitation of sodium sesquicarbonate crystal during the sodium carbonate monohydrate crystallization which reduces the quality of the final product. Another difficulty with underground solution mining is that the requirement of the high temperatures that are needed to increase the dissolving rate of trona and yield highly concentrated solutions required as feed to a conventional sodium carbonate monohydrate process. Substantial energy is required to heat the solvent sufficiently to off-set heat losses to the earth. Processes that add alkalis such as sodium hydroxide or lime to the solvent for solution mining reducing the energy requirements while increasing the dissolving rate have been demonstrated, but these neutralizing agents are unfortunately expensive.

Methods to process such sodium bicarbonate-bearing solutions have also been described and comprise a conversion of the alkali values to a more desirable crystal or crystals that can then be separated and processed to soda ash. When the processes involve two crystallization steps such processes yield two different species of sodium carbonate salts. Such processes describe the addition of expensive neutralizing agents to convert the sodium bicarbonate to sodium carbonate, steam or air stripping to convert the bicarbonate to carbonate and carbon dioxide gas, and even enriching the solution by contact with conventionally mined trona or carbonating the solution with carbon dioxide gas.

The economic attraction of solution mining is to avoid such costs as sinking new mine shafts, employing miners and equipment underground, and supporting mechanical mining operations. But, these benefits are offset by the cost of adding neutralizing agents to the slurries pumped into the mine and the operational costs and limitations associated with producing soda ash from such recovered streams.

A process as herein detailed that reduces the volume of the waste streams reporting to evaporation ponds would prolong the life of the ponds and allow a more economic option for grits and mud disposal than would be experienced employing underground disposal methods. Water balance would be achieved with the benefit of alkali recovery of the decahydrate deposits. A process of this kind would enrich the weak sodium carbonate-bearing streams, and if desired, precipitate sodium bicarbonate from such streams to produce a dilute sodium bicarbonate solution rich in sodium carbonate and suitable for recovering soda ash employing sodium decahydrate or sodium monohydrate processes. Such a process would also allow selective precipitation of other sodium carbonate salts such as sodium sesquicarbonate, sodium bicarbonate, and various densities of soda ash.

SUMMARY OF THE INVENTION

The present invention involves a novel process that employs a proportionate blending of different waste streams to enhance the level of recovery of sodium values from the waste streams. Crystallization processes employed in the commercial production of sodium carbonate salts require purge waste streams to exhaust concentrated impurities from the processes to achieve and maintain final product quality requirements. Solids present in the ore feed to the processes are typically removed in the liquor preparation step and are discharged to surface evaporation ponds or deposited underground, typically in abandoned mining panels. Trace species such as organics, chloride, silica and sulfate concentrate in the mother liquors separated from the desired crystals, a portion of which must be purged. The present invention deals with a series of processes whereby sodium values are recovered from these waste streams, and other waste streams such as mine water, evaporation pond supernatant, and other sodium bearing streams, prolonging the life cycle of surface impoundments and avoiding problems inherent to underground disposal schemes.

DETAILED DESCRIPTION OF THE INVENTION

Figure 1:
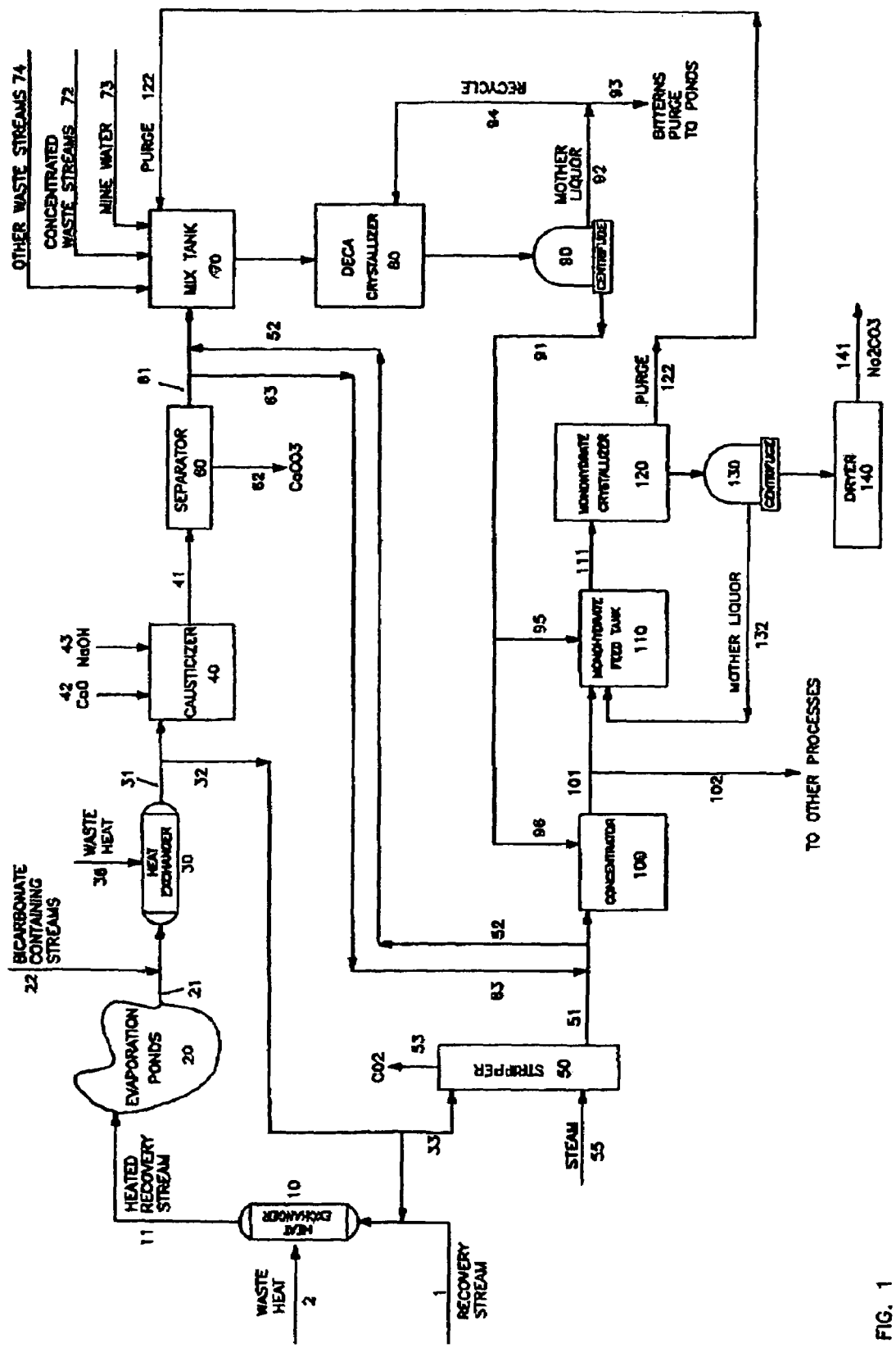
FIG. 1 is a flow diagram, which schematically illustrates the process of the invention.

Specifically, the present invention combines a variety of waste streams in proper proportions to produce a liquor stream wherein the sodium bicarbonate is reduced so as to suitably feed a sodium carbonate decahydrate process and recover soda ash. The beneficial results from the invention include:

1. Reduces operating costs for producing sodium carbonate liquors in processes such as sodium carbonate monohydrate processes by displacing liquors produced directly from mined trona ore and/or solution mining processes with those produced from recovered sodium values in waste streams;

2. Allows for combining various purge streams which are saturated in the desired salt with waste streams of lesser concentration, diluting said impurities to levels acceptable in recycle streams to the processing units; when the combined streams are further concentrated with sodium carbonate decahydrate, these streams are purified further;

3. Provides a sodium carbonate decahydrate process capable of recovering pure sodium carbonate crystals from streams too dilute to be efficiently recovered using the sodium carbonate monohydrate process. The sodium carbonate decahydrate crystal formed rejects impurities in the mother liquor and bonds with 10 molecules of water. The molecular water is pure, not contaminated in proportion to the concentrated impurities rejected by the sodium carbonate decahydrate crystal.

4. Reduces the final purge stream volume reporting to the evaporation ponds. Rather than purging individual evaporation/crystallization units to waste, those various purge streams, or combinations of said streams with other waste streams, are fed to the decahydrate unit. The single bittern purge stream from this unit is of less volume than the combined purge streams of the individual evaporation/crystallization units.

5. Extends life cycle of surface evaporation ponds. The purge stream reporting to the ponds is half the concentration and flow as would report without recovery achieved with the present invention.

6. Avoids the costs and hazards of other waste disposal schemes such as underground disposal.

7. The soda ash recovered from waste streams is more economically produced than soda ash produced using mechanical or solution mining methods.

8. Avoids problems associated with sequential crystallization or production of more than one salt, especially when the production of the salt of higher commercial demand is limited by the production of the second salt of lower commercial demand.

It is known that some waste streams generated in sodium carbonate processes contain sodium bicarbonate at concentrations-that make them unsuitable as direct feed to monohydrate processes. Some typical waste stream compositions are shown below:

| STREAM | $Na_2CO_3$ | $NaHCO_3$ | $Na_2SO_4$ | NaCl |
| --- | --- | --- | --- | --- |
| Mine Water | 10.6-23.8% | 1.4-5.0% | 0.06-0.6% | 0.5-2.8% |
| Pond Water | 6-22% | 0.6-1.6% | 0.4-1.6% | 0.2-0.6% |
| Total Containment Water | 1-12% | .03-.5% | .07-1.2% | .01-0.3% |
| Other Purge Streams | 3-14% | 3-13% | 1% | 1.1% |
| Monohydrate Purge | 30.1% | 1.2% | 1.7% | 1.0% |

Waste stream flow rate and sodium bicarbonate concentration must be considered to determine the most efficient and economical method for introducing the waste stream. Diluting the sodium bicarbonate with stronger sodium carbonate streams, such as sodium decahydrate crystals can minimize the cost of steam stripping and neutralization. It is desirable to increase the sodium carbonate concentration to at least 18% while reducing the sodium bicarbonate concentration to below 3.5%. Such a combination will produce a feed stream, suitable for feeding a decahydrate unit. A suitable monohydrate feed stream can be achieved by concentrating the sodium carbonate to above about 29% while reducing the sodium bicarbonate concentration to below about 1%. It is desirable to achieve less than about 1.4% sodium sulfate through such combinations so that the undesirable burkeite ($Na_2CO_3 \cdot 2Na_2SO_4$) crystal formation is avoided. In instances where such combination of streams can be concentrated in sodium carbonate and fed to a sodium bicarbonate process, the cost for converting sodium bicarbonate can be avoided entirely.

Consideration must be given to the seasonal concentration of sodium carbonate in streams such as evaporation pond supernatant. The supernatant is below the saturation concentration for sodium chloride, sulfate, and bicarbonate, but saturated in sodium carbonate at ambient conditions. The deposited decahydrate solids present in the evaporation ponds can be harvested to enrich the sodium carbonate concentration of the supernatant, if desired, during the colder months of the year. Having rejected impurities to the supernatant mother liquor when deposited, these deposits, when harvested, purify the supernant when dissolved, especially when the mother liquor was removed from the surface of the deposits when the pond water was cold and the sodium carbonate concentration the lowest. Such selective removal of mother liquor supernatant to a different evaporation cell during the cold months allows "solution mining" of said deposits by a second warm stream with lower concentrations of sodium bicarbonate, sulfate, and chloride.

The table below illustrates typical evaporation pond supernatant compositions during the four seasons of the year and include a typical analysis of the deposited decahydrate crystals. Those skilled in the art will recognize that various options exist for introducing the pond water, a combination of pond water and harvested decahydrate crystals, or solution mined decahydrate crystals to produce sodium carbonate liquors of sufficient concentration and quality to feed evaporation/crystallization steps and recover various sodium carbonate salts.

| | $Na_2CO_3$ | $NaHCO_3$ | $Na_2SO_4$ | NaCl |
| --- | --- | --- | --- | --- |
| Fall Pond Water | 8.5% | 1.2% | 1.3% | 0.4% |
| Winter Pond Water | 7% | 0.7% | 0.7% | 0.3% |
| Spring Pond Water | 13% | 0.9% | 0.9% | 0.3% |
| Summer Pond Water | 17% | 1.3% | 1.0% | 0.4% |
| Decahydrate Deposit | 36% | 0.1% | 0.6% | 0.1% |

In accordance with the present invention, combining waste streams and reducing the sodium bicarbonate concentrations where necessary will consume the waste streams, utilizing the water present in those streams and recovering the sodium values therein, thereby reducing significantly the flow of waste water reporting to the surface evaporation ponds. With appropriate pond management, the newly created waste purge stream from the decahydrate unit will be about 50 percent less than the purge rate required to maintain equivalent dense soda ash final product quality. The sodium carbonate deposition rate will be about 45 percent less, based on purge rate and sodium carbonate concentration. Decahydrate introduced into some sodium carbonate streams will increase the water load when compared to producing from anhydrous soda ash, requiring a purge stream to maintain water balance. Said purge stream will improve the product quality of the crystal produced when compared to producing the same salt from anhydrous sodium carbonate and not utilizing a purge stream.

In the process of the invention the soda-bearing waste water is mixed in appropriate proportion to achieve a liquor with a composition suitable for decahydrate unit feed. An optional introduction point in the treatment process is a steam stripper or a causticizing step where either calcium oxide (quick lime), calcium hydroxide (slaked lime), sodium hydroxide (caustic), or other alkali is added to reduce the sodium bicarbonate concentration to below 3.5% when fed to a sodium decahydrate unit or to below 1% when fed to a sodium monohydrate process. It may be necessary to concentrate the decarbonized liquor prior to feeding the decahydrate or monohydrate processes. The liquor can be enriched by melting decahydrate formed from the decahydrate step, by introducing decahydrate crystals deposited in the evaporation ponds, by evaporating a portion of the water through a third effect evaporator body, cooling tower, or other evaporative step.

Where a purer sodium carbonate salt is desired, it is beneficial to crystallize said salt from a sodium carbonate decahydrate produced stream. Sodium carbonate decahydrate has the ability to reject impurities and bond with 10 molecules of water when crystallized. This molecular water is pure, not contaminated in proportion to the concentrated impurities rejected by the crystal, purifying the liquor streams into which it is introduced. The sodium carbonate decahydrate crystal is more concentrated in sodium carbonate than saturated sodium carbonate liquor is. Purer process liquor with higher sodium carbonate concentration can be achieved, thus reducing the amount of water to be cooled or evaporated in downstream evaporation/crystallization steps.

The sodium crystals produced from a crystallization/evaporation process whereby the feed liquor originated from anhydrous soda ash can be further purified by introducing sodium carbonate decahydrate crystals. The water imbalance caused by the 10 molecules of water introduced with the decahydrate crystal, when purged, will reduce the impurities otherwise concentrated in the recycle stream. This purge stream, being less concentrated in impurities, is preferably mixed with other waste streams and concentrated appropriately to feed a sodium carbonate decahydrate unit. The lower volume, more impure bittern purge stream from the sodium decahydrate unit will be the single source of waste water reporting to the evaporation ponds.

The Process of the invention provides the following benefits:

1. Consumes water and concentrates sodium carbonate when various sodium carbonate bearing waste streams are combined and cooled to precipitate sodium carbonate decahydrate.
2. Purifies the liquor streams into which the formed decahydrate crystals are melted and dissolved. The ten molecules of pure water bound to the sodium carbonate in the decahydrate crystal are pure water, not contaminated in proportion to the concentrated impurities rejected into the mother liquor by the decahydrate crystal.
3. Provides a concentrated source of sodium carbonate (decahydrate is 37% sodium carbonate compared to 31% available in a concentrated liquor), purer than sodium carbonate liquors produced from mine ore, solution mined liquor, and other sodium carbonate bearing streams, to concentrate other streams of less sodium carbonate value appropriately to feed an evaporation/crystallization step to recover sodium salts, such as with a sodium monohydrate process.
4. Sodium carbonate from waste streams fed to evaporation ponds is recovered by "solution mining" sodium carbonate decahydrate deposited offering a substantial economy over the life of the sodium carbonate plant.
5. Crystallization processes used to produce sodium salts require purge streams to achieve and maintain final product quality. The impurities resident in the feed liquors are concentrated to a mother liquor during the crystallization step. Steps involving evaporation/crystallization concentrate said impurities further. The invention permits combining various purge streams which are saturated in the desired salt with waste streams of lesser concentration, diluting said impurities to levels acceptable in recycle streams to the processing units. When said combined streams are further concentrated with sodium carbonate decahydrate, these streams are purified further.
6. The invention provides a system for combining the various purge streams and adjusting the sodium carbonate concentration appropriately to feed the evaporation/crystallization steps of downstream processes such that the bittern purge stream of the sodium carbonate decahydrate crystallizer is of sufficient volume to allow pure downstream crystals to be formed, yet is of less volume than that of the combined individual downstream evaporation/crystallization purge streams.
7. The liquor streams produced through combination and concentration of existing waste streams and available waste deposits provides a less expensive source of sodium carbonate feeding evaporation/crystallization steps than is otherwise achieved using sodium carbonate recovered through conventional mining techniques, solution mining techniques, and other techniques known to the art.
8. Extends the life cycle of surface evaporation ponds. The purge stream reporting to the pond is half the concentration and flow as would report without recovery achieved with the present invention.
9. Avoids the costs and hazards of other waste disposal/recovery schemes such as underground disposal and solution mining.

The invention is described in greater detail by reference to the accompanying flow diagram: Stream 1, low in sodium carbonate/sodium bicarbonate concentration, is heated using waste heat (stream 2) from sources such as a condenser in a triple effect evaporator or waste heat from a steam stripper, in heat exchanger 10 and sent to evaporation pond 20, where it dissolves previously deposited sodium carbonate decahydrate crystals. The enriched stream, 21, is combined with other sodium bicarbonate containing flows (stream 22) obtained from other processes and is further heated in heat exchanger 30, also with waste heat (stream 36). The resulting stream, 31, can be recycled back through stream 32 to the previous steps in order to increase its sodium values and/or temperature. If the sodium values and temperature are deemed acceptable, then stream 31 can be processed through causticizer 40 or steam stripper 50 (stream 33).

After stream 31 has reached 120° F.-140° F., it is fed to causticizer 40, where the addition of lime (stream 42) and/or sodium hydroxide (stream 43) converts bicarbonate values to carbonate values and produces calcium carbonate ($CaCO_3$) as a byproduct. Stream 41, leaving causticizer 40, has less than 3.5% sodium bicarbonate content and it is directed to separator 60, where the calcium carbonate byproduct is removed from the process. Stream 61, now low on sodium bicarbonate values, is directed to mix tank 70, where it is blended with other streams for further treatment by way of a decahydrate process or it can be sent directly to a monohydrate process.

Mix tank 70 blends the recovery stream low on sodium bicarbonate (61) with mine water (73), monohydrate crystallizer purge (122), concentrated waste streams (72), and other waste streams (74). This blend is then fed to decahydrate crystallizer 80, where sodium decahydrate crystals are produced. These crystals are then separated from the mother liquor in centrifuge 90. A portion of this mother liquor (stream 92) can be recycled (stream 94) and the remainder can be sent to the ponds (stream 93). Purge stream 93 is adjusted to maintain the concentration of $Na_2SO_4$ present in the mother liquor below 1.4%. The decahydrate crystals can be sent via stream 63 to concentrator 100 (via streams 91, 96) or they can be sent via stream 11 to monohydrate feed tank 110 (via streams 91, 95).

Concentrator 100 receives decahydrate crystals and stream 51 from steam stripper 50. From here this stream can be directed towards other processes (stream 102) or via stream 101 to monohydrate feed tank 110. Feed tank 110 feeds liquor via stream 111 to monohydrate crystallizer 120, where sodium monohydrate crystals are produced. These crystals are then separated from the mother liquor in centrifuge 130. The separated crystals are dried to anhydrous sodium carbonate crystals in dryer 140 and exit the process as finished product via stream 141. The mother liquor (stream 132) is recycled back to feed tank 110 for further recovery of sodium values. Purge stream 122 is required in order to maintain the $Na_2SO_4$ levels below 1.4% in the monohydrate crystallizer mother liquor.

In addition, once stream 31 reaches desired levels of temperature and sodium concentration, it is possible to send this stream to steam stripper 50, where sodium bicarbonate is transformed to sodium carbonate by the introduction of steam (stream 55). $CO_2$ is the byproduct of this operation (stream 53) and it can be disposed or recovered. Stream 51, now having less than 1% sodium bicarbonate, can be further treated by way of a decahydrate process (stream 52) and/or a monohydrate process.

It is thus seen that in the process of the present invention, wherein soda values are recovered from various waste streams and other sodium carbonate bearing streams, impurities are rejected to a bitterns pond at a rate less than that required when not practicing the instant invention. The bitterns purge rate is determined based on the final product quality requirements for individual unit operations producing sodium carbonate decahydrate, sodium carbonate monohydrate, and other sodium salts. The individual unit operation purge streams are combined appropriately to produce a liquor feed stream comprised of the wasted sodium value that is then recovered through sodium decahydrate crystallization. The crystal formed adequately rejects the impurities resident in pregnant liquors from which it was produced, this purification step consuming water and sodium carbonate that can enrich other sodium bearing streams, or feed directly downstream evaporation/crystallization processes such as sodium carbonate monohydrate processes.

The process of the invention utilizes the following advantageous functional steps:

1. Sodium bicarbonate bearing waste streams are suitably decarbonized to reduce the sodium bicarbonate concentration prior to sodium decahydrate or sodium monohydrate crystallization.
2. The sodium bicarbonate concentration in the bicarbonate bearing stream is reduced using any suitable known method, such as reacting said sodium bicarbonate with a neutralizing agent such as calcium oxide, calcium hydroxide, sodium hydroxide or other alkalis. Steam and air stripping can be employed. Diluting the sodium bicarbonate concentration using a variety of other streams or by the addition of sodium carbonate decahydrate will reduce the sodium bicarbonate concentration.
3. The calcium carbonate formed during the causticizing step is separated from the sodium carbonate solution and can be disposed of or further processed to form a calcium chloride solution with the reaction of hydrochloric acid.
4. The liquor produced by combining the various sodium carbonate bearing streams is concentrated to an appropriate sodium carbonate/sodium bicarbonate concentration. This is accomplished using purge streams from the sodium carbonate monohydrate process or decahydrate crystals from the decahydrate process.
5. The concentration of sodium bicarbonate can be maintained below 3.5% and is maintained preferably below 1.5% to avoid co-precipitation with sodium decahydrate in the evaporative cooling step.
6. The concentration of sodium sulfate can be below 1.4% to avoid burkeite crystal co-precipitation with sodium decahydrate in the evaporative cooling step.
7. The concentration adjusted liquor stream undergoes evaporation/crystallization to form the specific desired sodium carbonate salts, such as sodium carbonate decahydrate and sodium carbonate monohydrate.
8. The sodium carbonate decahydrate crystals can be used to further concentrate more dilute sodium carbonate bearing streams, or can be further processed to form light or medium density anhydrous soda ash.
9. Sodium decahydrate crystals can replace anhydrous sodium carbonate or sodium carbonate monohydrate as process liquor make-up. The decahydrate introduces 10 molecules of pure water that may result in water imbalance. Purer sodium crystals are formed when such excess-water and the impurities concentrated in downstream crystallization/evaporation steps are therefore purged at a higher rate.
10. Various separate purge streams are combined and adjusted in sodium carbonate/bicarbonate/sulfate concentration appropriately to feed a sodium carbonate decahydrate unit. The bittern purge stream of said decahydrate unit is of lower volume and higher impurity concentration than the combination of separate various purge streams. This purge rate is determined by the accumulation of sodium bicarbonate and/or sodium sulfate that when concentrated co-precipitate in the decahydrate crystallization step as described previously.
11. The bittern purge rate is estimated to be at least 50 percent less in volume and 45 percent less concentrated in sodium carbonate value than would be present if the individual unit evaporation/crystallization unit purge streams were deposited in the evaporation ponds and sodium carbonate decahydrate crystals not recovered.
12. The life cycle of the surface evaporation ponds will be about doubled because of the lower flow and concentration of the bittern purge stream. The costs and hazards of underground disposal are avoided.
13. The soda ash recovered from waste streams is more economically produced than soda ash produced using mechanical mining or solution mining methods.

Although the invention has been described in terms of particular embodiments, variations to the details described herein can be made and substitutes for known process aides known to those skilled in the art can be used without departing from the invention. Thus, the invention is not meant to be limited to the details described herein, but only by the scope of the appended claims.

What is claimed is:

1. A sodium carbonate monohydrate process for recovering refined soda ash from waste deposits that contain sodium carbonate and sodium bicarbonate, by combining at least two aqueous streams derived from streams of waste sodium carbonate deposits that contain sodium carbonate and sodium bicarbonate and that contain sodium carbonate in amounts too dilute to be effectively separately recovered by a monohydrate process, comprising:
   a. proportioning and pretreating the said waste streams in a mix tank to produce a combined feed stream enriched in and containing at least 29% sodium carbonate, and reducing the sodium bicarbonate and sodium sulfate contained in said waste streams to below a concentration of 3.5% sodium bicarbonate and less than about 1.4% of sodium sulfate; and
   b. introducing said proportioned and pretreated waste streams directly to a monohydrate process to produce the refined soda ash product.

2. The method of claim 1 wherein in the pretreatment the bicarbonate level of the waste streams is reduced by stream stripping.

3. The method of claim 1 wherein in the pretreatment the bicarbonate level of the waste streams is reduced by causticization.

4. The method of claim 1 wherein in the pretreatment the bicarbonate level is reduced to below about 1.0 percent.

5. The process of claim 1 wherein the source of the pretreated waste stream is selected from mine water, pond water, containment basins and impounded sodium decahydrate deposits.

6. The method of claim 1 wherein the source of the pretreated waste stream comprises impounded sodium decahydrate deposits enriched by introducing warm water.

7. A process according the claim 1 wherein at least one of the waste streams is enriched in sodium carbonate concentration by a step selected from:

a. combining streams of lesser sodium carbonate concentration with streams of higher sodium carbonate concentrations;
b. enriching streams of lesser sodium carbonate concentration with decahydrate crystals; and
c. evaporating water from the waste stream by a means selected from the third effect of a triple effect crystallizer train, cooling towers, evaporator coolers and air cooled spray evaporator/crystallizer, and a combination of the above steps.

8. The method of claim 1 wherein sodium carbonate decahydrate crystals are combined with mother liquor from the monohydrate process is introduced with the waste streams to the monohydrate process.

9. The process of claim 1 wherein a purge stream from the monohydrate process is combined with the waste stream to the monohydrate process.

* * * * *